United States Patent Office 2,761,431
Patented Sept. 4, 1956

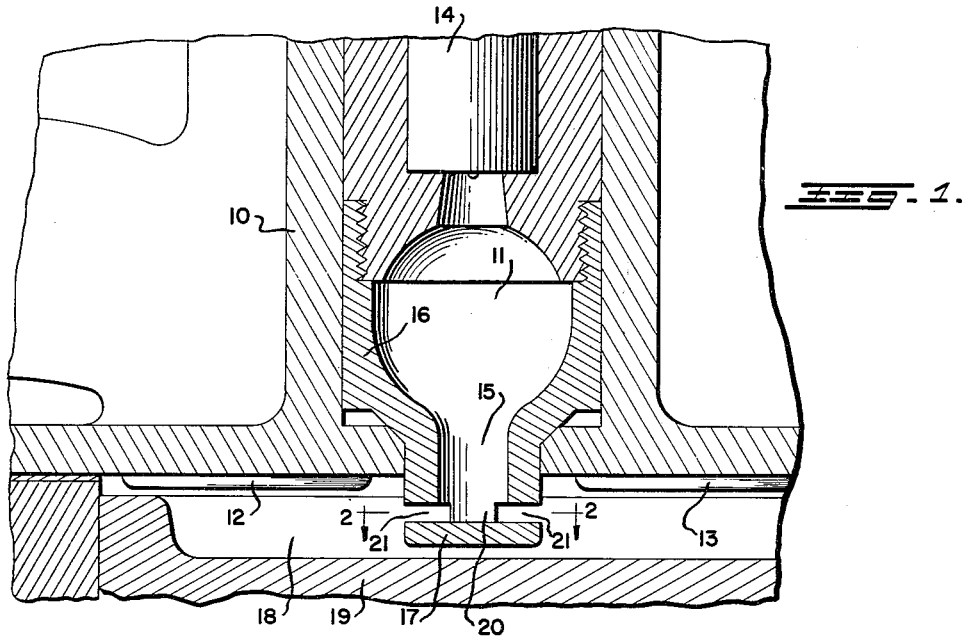
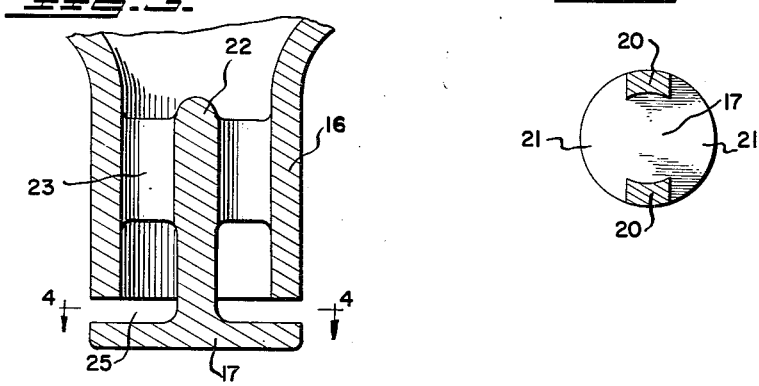
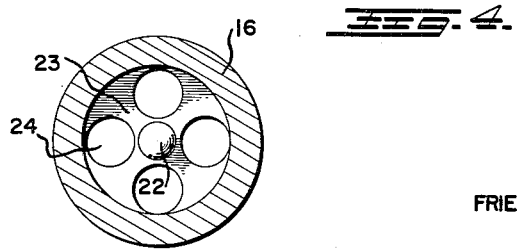

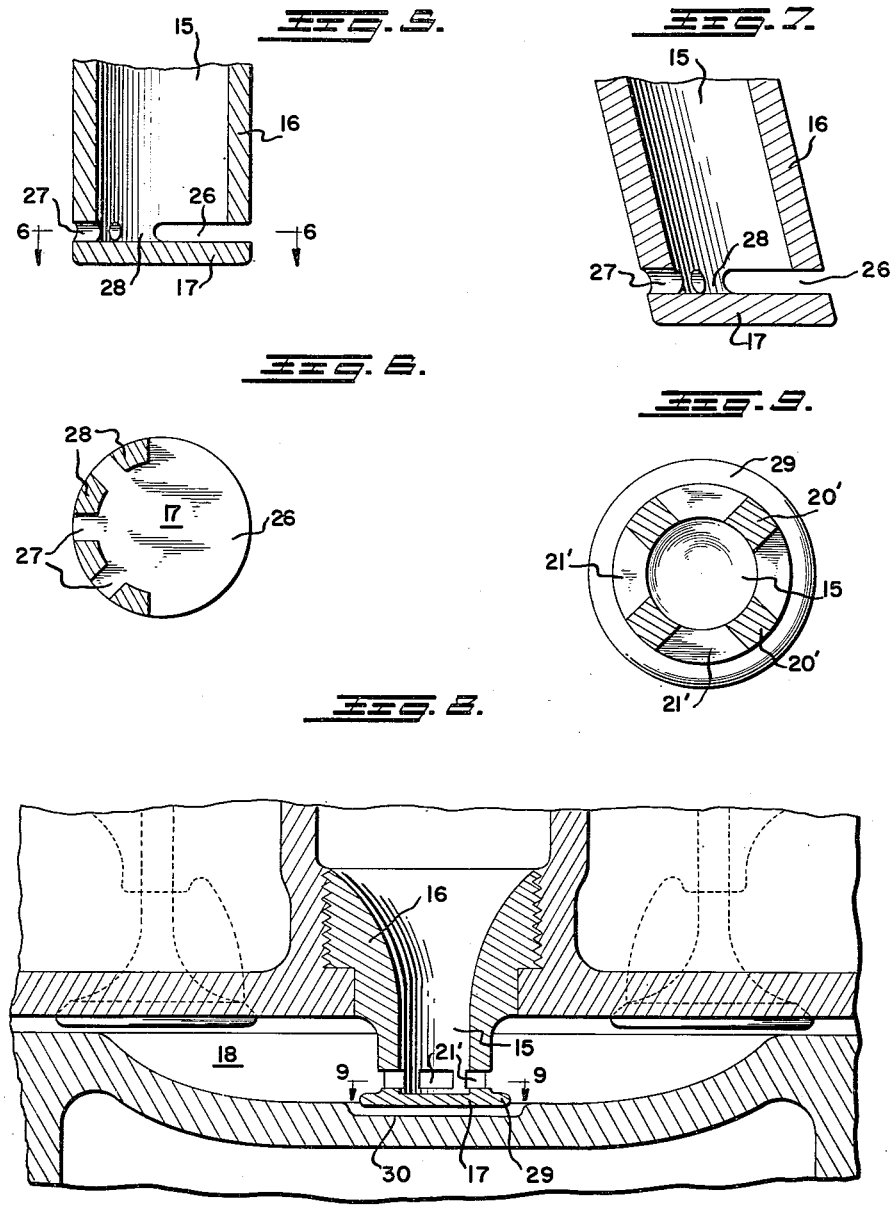

2,761,431

INJECTION TYPE INTERNAL COMBUSTION ENGINE WITH PRECOMBUSTION CHAMBER

Friedrich K. H. Nallinger, Stuttgart, Germany, assignor to Daimler-Benz Aktiengesellschaft, Stuttgart-Unterturkheim, Germany Application May 15, 1951, Serial No. 226,352
In Germany February 22, 1950

Public Law 619, August 23, 1954
Patent expires February 22, 1970

12 Claims. (Cl. 123—32)

The present invention relates to a precombustion chamber compression-ignition engine in which fuel is injected into the precombustion chamber preferably in the direction of the transfer port to the main combustion chamber and in which the contents of the precombustion chamber leaving the latter is distributed at the end of a transfer port transversely to the axis thereof over the main combustion chamber thereby enabling a highly uniform distribution of fuel over the main combustion chamber and a very low fuel consumption.

It is one of the primary objects of the invention to provide a combination of the advantages of as uniform as possible a distribution of fuel over the main combustion chamber with those of a relatively low thermally stressed piston. Accordingly, one feature of the invention substantially consists in that the precombustion chamber presents a deflection plate arranged transversely to the transfer port, screening the latter against the piston head, and above said deflection plate a transversely directed annular gap and one or a plurality of gap-like apertures extending in the peripheral direction over the entire periphery or part thereof thereby deflecting the contents of the precombustion chamber issuing through the transfer port towards the external zones of the main combustion chamber.

Several embodiments of the invention, by way of example, are illustrated in the accompanying drawing, wherein:

Fig. 1 is a sectional view of a precombustion chamber with the deflecting plate connected by two narrow webs with a sleeve-like exterior portion of an insert member;

Fig. 2 is a cross-section on the line 2—2 of Fig. 1;

Fig. 3 is an axial section through one embodiment with a core member arranged within the transfer port and a deflection plate secured thereto;

Fig. 4 is a plan view of the embodiment shown in Fig. 3;

Fig. 5 is an axial section through another embodiment with unilaterally arranged connecting webs for the deflection plate;

Fig. 6 is a cross-section on the line 6—6 of Fig. 5;

Fig. 7 is an axial section through an embodiment substantially corresponding to that of Fig. 5 for obliquely arranged precombustion chambers;

Fig. 8 is an axial section through another embodiment with an enlarged deflection plate, and Fig. 9 is a section on the line 9—9 of Fig. 8.

In Fig. 1 there is arranged in the water-cooled cylinder head 10 a precombustion chamber 11, disposed, for instance, centrally between four valves 12 and 13. The fuel is injected through a nozzle 14 in the direction to the transfer port 15, the latter being confined by an insert member 16 and screened by a deflection or baffle plate 17 against the main combustion chamber 18 substantially formed by a recess in the piston head 19. The deflection plate 17 is carried by means of two webs 20 by the insert member 16 in such a manner that two apertures in the shape of two semi-circular gaps or slots 21 are formed through which the contents of the precombustion chamber are distributed as uniformly as possible over the external zones of the main combustion chamber. The apertures 21 may be made, for instance, by a milling cutter. The insert member may be so arranged as to dip more or less far into the piston recess, reaching, for instance, also into close proximity of the piston head in the piston top center, so that the contents of the precombustion chamber are injected along the bottom of the piston recess in the same manner with the swirling motion as caused by the displacing action of the piston rim.

In the case of the embodiment shown in Figures 3 and 4, the insert member 16 is provided with a central core member 22 connected by webs 23 with the exterior part of the insert member so that a plurality (for instance 4, 5 or 6) of circularly arranged passageways 24 are formed, said core member carrying at its lower end the deflection plate 17. In this case a continuous annular gap or slot 25 is formed.

The embodiments illustrated in Figures 5 to 6 and in Fig. 7 are particularly suitable for precombustion chambers arranged eccentrically or eccentrically and obliquely with respect to the main combustion chamber. In this case, the transfer port 15 is in connection with the main part of the main combustion chamber through an aperture 26 in the form of an annular gap covering, for instance, a range of 180° or more, and with the remaining part of the main combustion chamber through, for instance, a plurality of smaller apertures 27 of equal or different cross-sections, the total cross section of which is determined by the volume of said remaining part, the single apertures 27 being formed by the webs 28 carrying the deflection plate 17. In the embodiment shown in Fig. 7 the axis of the precombustion chamber and of the transfer port 15 respectively is arranged slantingly, i. e. at an angle other than 90° with respect to the plane of the annular gap or slot 26.

In the embodiment shown in Figures 8 and 9, the baffle or deflection plate 17 is connected with the sleeve-like portion of the insert member 16 by four webs 20' so that four gap- or slot-like apertures 21' are formed. The deflection plate is provided with a rim 29 projecting beyond the apertures 21' providing an additional guiding action for the contents leaving the precombustion chamber and an additional screening preventing the burning precombustion chamber gases from immediately impinging upon the piston head. It is also possible, of course, to provide a deflection plate enlarged by a rim 29 or the like, with all of the other embodiments, for instance, also with the deflection or baffle plate being secured to a central core member, similar to the arrangement shown in Fig. 3.

In addition thereto, arrangement may be made in all cases so that the contents of the precombustion chamber issuing through the annular gap is blown out into the main combustion chamber closely above the piston head. To this end the piston head may have, for instance, within a recess 18 an additional recess 30, as indicated in Fig. 8, into which the deflection plate may dip in the piston top center. It is particularly convenient in that case to provide a rim 29.

What we claim is:

1. In an injection-type internal combustion engine, a cylinder space and a piston reciprocating therein, a main combustion chamber formed in said cylinder space in the piston top center thereof, a precombustion chamber connected with said main combustion chamber through a transfer port, an insert member lining said transfer port, a plate terminating said transfer port in the direction of said main combustion chamber, means for connecting said plate to said insert member and forming at least one slot-like aperture immediately above said plate, said aperture extending along the periphery of said plate and forming at least a substantial portion of an annular slot through which said transfer port is in connection with said main combustion chamber in a substantially radial direction, and a recess in the piston head substantially limited in size to said plate, with only said plate projecting into said recess and with said slot-like aperture remaining thereabove to provide for ejection of the contents of said precombustion chamber through said aperture closely above said piston head.

2. In an injection type internal combustion engine, the combination defined in claim 1, wherein said insert member projects into said main combustion chamber, and said plate extends radially beyond the external, peripheral contours of the end portion of said insert member.

3. In an injection-type internal combustion engine, a piston, a disk-like main combustion chamber delimited on one side thereof by the piston head of said piston, a precombustion chamber in communication with said main combustion chamber, and intermediate means between said main combustion chamber and said precombustion chamber forming an essentially cylindrical passage in the axial direction thereof, said intermediate means including a baffle plate extending into said disk-like main combustion chamber close to said piston head and being provided with at least one circumferentially extending throttling opening therein which opens radially into said main combustion chamber and extends over at least a substantial portion of an arc of the circumference of said intermediate means to provide for the ejection of the contents from said precombustion chamber into said main combustion chamber through said aperture closely above said piston head the diameter of said cylindrical passage being several times the height of said throttling opening in said axial direction to provide the main throttling effect between said precombustion chamber and said main combustion chamber in said throttling opening.

4. In an injection-type internal combustion engine, a cylinder, a piston reciprocating in said cylinder, a main combustion chamber of flat disk-like shape delimited at one side thereof by the piston head of said piston, a precombustion chamber, a transfer port between said main combustion chamber and said precombustion chamber, an insert member lining said transfer port, said insert member being of essentially cylindrical internal configuration within the region of said transfer port and carrying a substantially flat plate essentially perpendicular to the cylinder axis in the form of a bottom for said insert member in the direction of said main combustion chamber, and at least one slot-like aperture arranged around said plate and extending in the peripheral direction within said insert member immediately above said plate, said transfer port being in communication with said main combustion chamber through said slot-like aperture in a substantially radial direction, and said insert member projecting into said main combustion chamber close to said piston head to provide ejection of the contents from said precombustion chamber into said main combustion chamber through said slot-like aperture closely above said piston head.

5. In an injection-type internal combustion engine, the combination as defined in claim 4, wherein said slot-like aperture forms a single annular gap uninterrupted over the entire extension thereof.

6. In an injection-type internal combustion engine the combination as defined in claim 4, further comprising a core member within said transfer port connected with the wall of said insert member and carrying said plate.

7. In an injection-type internal combustion engine, the combination as defined in claim 4, further comprising a core member within said transfer port including web means for connecting said core member with said insert member and for carrying said plate to provide a peripheral annular slot by the said plate and said insert member.

8. In an injection-type internal combustion engine, a cylinder space and a piston reciprocating therein, a relatively flat disk-like main combustion chamber formed in said cylinder space in the piston top center thereof, a precombustion chamber connected with said main combustion chamber through a transfer port, an insert member lining said transfer port, a plate terminating said transfer port in the direction of said main combustion chamber, and means for connecting said plate to said insert member and forming at least one slot-like aperture immediately above said plate, said aperture extending along the periphery of said plate and forming at least a substantial portion of an annular slot through which said transfer port is in communication with said main combustion chamber in a substantially radial direction, said slot-like aperture discharging directly above said plate in the direction of the largest dimension of said relatively flat disk-like main combustion chamber to provide for ejection of the contents of said precombustion chamber through said aperture closely above the piston head.

9. In an internal combustion engine the combination according to claim 8, wherein said main combustion chamber is formed by a relatively shallow recess in said piston head extending over a considerable portion in said piston head.

10. In an injection-type internal combustion engine the combination according to claim 8, further comprising a cylinder head with said precombustion chamber arranged therein offset from the cylinder axis, said transfer port being arranged obliquely with relation to the cylinder axis and discharging eccentrically into said main combustion chamber, and said plate extending substantially perpendicularly to the cylinder axis and being connected with said cylinder head in such a manner that the main cross-section of the communication from said transfer port into said main combustion chamber is located at the side thereof adjacent the cylinder axis.

11. In an injection-type internal combustion engine the combination according to claim 8, wherein said plate extends radially beyond the external peripheral contours of the end portion of said insert member.

12. In an injection-type internal combustion engine, a cylinder space and a piston reciprocating therein, a relatively flat disk-like main combustion chamber formed in said cylinder space in the piston top center thereof, a precombustion chamber connected with said main combustion chamber through a transfer port, an insert member lining said transfer port, a plate terminating said transfer port in the direction of said main combustion chamber, means for connecting said plate to said insert member and forming at least one slot-like aperture immediately above said plate, said aperture extending along the periphery of said plate and forming at least a substantial portion of an annular slot through which said transfer port is in communication with said main combustion chamber in a substantially radial direction, said main combustion chamber being formed by a relatively shallow recess in the piston head extending over a considerable portion thereof, and a further recess in the piston head essentially limited in size to said plate, with only said plate projecting into said recess and with said slot-like aperture remaining thereabove and discharging directly above said plate in the direction of the largest dimension of said relatively flat disk-like main combustion chamber to provide for ejection of the contents of said precombustion chamber through said aperture closely above said piston head.

References Cited in the file of this patent
UNITED STATES PATENTS 1,464,906    Hentschke _____ Aug. 14, 1923

(Other references on following page)

UNITED STATES PATENTS

| | | |
|---|---|---|
| 1,479,085 | Nordberg | Jan. 1, 1924 |
| 1,527,923 | Rothardt | Feb. 24, 1925 |
| 1,579,351 | Eltze | Apr. 6, 1926 |
| 1,626,202 | Lucke | Apr. 26, 1927 |
| 1,629,111 | Lucke | May 17, 1927 |
| 1,700,903 | Marburg | Feb. 5, 1929 |
| 2,171,912 | Boxan | Sept. 5, 1939 |

FOREIGN PATENTS

| | | |
|---|---|---|
| 65,808 | Austria | July 25, 1914 |
| 365,751 | Germany | Dec. 21, 1922 |
| 308,316 | Great Britain | Feb. 27, 1930 |
| 690,327 | France | Sept. 18, 1930 |
| 883,106 | France | Mar. 15, 1943 |
| 209,214 | Switzerland | June 17, 1940 |